United States Patent [19]

Cohen et al.

[11] Patent Number: 5,644,357
[45] Date of Patent: Jul. 1, 1997

[54] BURST DRIVING OF SINGLE-PANEL DISPLAY

[75] Inventors: David A. Cohen, Ossining; Peter J. Janssen, Scarborough, both of N.Y.

[73] Assignee: Philips Electronics North America Corporation, New York, N.Y.

[21] Appl. No.: 356,939

[22] Filed: Dec. 15, 1994

[51] Int. Cl.$^6$ ................................. H04N 9/31
[52] U.S. Cl. .............................. 348/196; 348/742
[58] Field of Search .......................... 345/98, 99, 100, 345/104, 109; 348/196, 742; H04N 9/31

[56] References Cited

U.S. PATENT DOCUMENTS

| | | | |
|---|---|---|---|
| 3,783,184 | 1/1974 | Ernstoff et al. | 348/742 |
| 5,159,325 | 10/1992 | Kuijk et al. | 340/783 |
| 5,416,514 | 5/1995 | Janssen et al. | 348/742 X |
| 5,508,738 | 4/1996 | Janssen et al. | 348/742 X |

FOREIGN PATENT DOCUMENTS

| | | |
|---|---|---|
| 0492721 | 7/1992 | European Pat. Off. . |
| 9526110a1 | 9/1995 | WIPO . |

OTHER PUBLICATIONS

Lauer et al., "A Frame–Sequential Color–TV Projection Display", SID 90 Digest pp. 534–537.

Haven, "Reinventing The Color Wheel", Information Display Jan. 1991, pp. 11–14.

*Primary Examiner*—Mark R. Powell
*Attorney, Agent, or Firm*—Robert J. Kraus

[57] ABSTRACT

A single-panel matrix display has rows of pixels continually illuminated by scanning red, green and blue light bands. The transmissivity of the rows is modulated for each colored light band in turn by sequentially driving a group of closely-spaced rows of the pixels which are about to be illuminated by the color light band.

7 Claims, 7 Drawing Sheets

BURST DRIVING OF SINGLE-PANEL DISPLAY

BACKGROUND OF THE INVENTION

1. Field of the Invention

This invention relates to color video display apparatus and in particular to such display apparatus employing light valves.

2. Description of Related Art

Video projection display apparatus are commonly used to produce images which are larger than can be economically produced by direct-view display apparatus, such as direct-view cathode-ray-tube and liquid-crystal display apparatus. One of the most popular projection display apparatus employs three small (e.g. 7-inch diameter) monochrome cathode-ray tubes, for producing respective images consisting of red, green and blue pixels of a composite color image. These three monochromatic images are combined by a system of lenses which also focuses the resultant full-color image onto a large (e.g. 52-inch diagonal) screen.

A proposed successor to the three-CRT color projection display apparatus is a single-panel color projection display apparatus, such as is disclosed in European Patent Application 0 492 721 A2, which was published on 1 Jul. 1992 and which corresponds to pending U.S. patent application Ser. No. 218,882 filed on 25 Mar. 1994, both of which are hereby incorporated by reference. This single-panel display apparatus eliminates a number of problems associated with multiple-CRT projection display apparatus, such as misregistration of multiple mono-chromatic images on a screen and the need for stable high-voltage power sources for the CRTs. The single-panel display apparatus also has the advantage that it can be used in either projection or direct-view applications.

A preferred embodiment of the single-panel color projection display apparatus is illustrated in FIG. 1. The apparatus comprises a source 10 of intense white light which is reflected by a mirror 12 through rectangular-beam-shaping means onto a dichroic mirror system 14. The dichroic mirror system splits the impinging rectangular beam of white light into separate rectangular component bands of red, green, and blue light and directs these three colored light bands onto a rotatable prism assembly 16. Upon rotation, the prism assembly repeatedly scans the red, green, and blue bands through relay lenses 18 and 20, which image the spatially-separated scanning colored light bands onto a light valve panel 22 having an array of pixels. The scanning colored light bands are separated from each other by one-third of the panel height. Each time a light band of one color leaves the bottom of the array a corresponding light band of the same color appears at the top of the array and begins its scan.

The light valve panel 22 comprises a variable-transmissivity matrix array of pixels arranged in rows and columns. As used herein, the word "transmissivity" includes both light transmission from a surface (i.e. reflection) and transmission through a medium typical panel of this type is the well known liquid-crystal display (LCD) panel. The light valve panel modulates the bands of light, in response to applied video data, and forms a color image which is focused by a projection lens 24 onto a screen (not shown).

Before each colored light band passes over a respective row of pixels, the video data for that row must be applied to the column conductors of the array and the row must be selected. Because three different rows will be illuminated substantially simultaneously by the three different colored light bands, either three separate column conductors and drivers must be provided for each column of pixels or the data must be provided sequentially to the column conductors at three times the video line rate. The former approach further complicates the row and column drive electronics topography of an already-complicated light valve 22. The latter approach avoids that complication, but has been found to have limitations, particularly in the realm of high-definition television (HDTV) where the potential image quality and the video line rate are higher than those of conventional television.

A first limitation evidences itself by an artifact which appears as ghosts in the displayed image. The visibility of these ghosts increases with contrast and with increased video line rates. As a simple example, if a displayed image comprises a screen full of text, an original line of text at the top of the screen may reappear one-third of the screen height from the top of the screen as a first-order ghost, and may again appear two-thirds of the screen height from the top of the screen as a second-order ghost. In general, an original line of video and the first and second-order ghosts of the video line will be sequentially displayed at positions which are separated by approximately one-third of the total number of displayed video lines. In moderate to high-contrast images, a ghost becomes objectionable if it has a light output which exceeds about 1% of the average light output of the overall image presented on the screen. Typical ghosts experienced in producing moderate to high-contrast images with the single-panel display apparatus have brightnesses (relative to the average instantaneous light output of an image presented on the screen) of about 2% (for first-order ghosts) and 0.02% (for second-order ghosts). Such first-order ghosts generally annoy viewers. The second-order ghosts are not generally annoying, but are visible.

Additional limitations relate to the color accuracy and the brightness accuracy of the image produced by the single-panel display. While not so inaccurate as to be annoying, or even noticeable to a casual viewer, there are substantial, measurable errors in both the color and the brightness of the image.

SUMMARY OF THE INVENTION

It is an object of the invention to eliminate the appearance of objectionable ghosts from images produced by a single-panel color display apparatus.

It is another object of the invention to improve the color and brightness accuracy of single-panel display apparatus.

It is yet another object of the invention to eliminate the objectionable ghosts and to improve the color and brightness accuracy without substantially complicating the row/column drive electronics of the single-panel display apparatus.

The invention is based on the recognition that the geometry of the colored-light-band-scanning optics of the single-panel display apparatus leads to a problem relating to the necessarily rapid transfer of video data to the array of pixels in the panel. In the preferred embodiment of this display apparatus, the three colored light bands are spaced apart and ordered such that, when they are scanned across an N-row array, a first band (e.g. red) arrives at pixel row 1 while a second band (e.g. green) arrives at row 1+N/3 and while a third band (e.g. blue) arrives at row 1+2N/3. This maximizes the rate of illumination of the array, but also leads to a sequence of data transfer that, in some instances, requires the drive electronics to operate at transfer rates that are beyond its capabilities.

In operating the single-panel display apparatus as disclosed in European Patent Application 0 492 721 A2, video data is sequentially applied to the column drivers for the pixels in the three rows which are immediately to be illuminated by the scanning colored light bands. For example, in a single video line period occurring just before the red, green and blue bands simultaneously illuminate rows 1, 1+N/3, 1+2N/3, the column drivers must, in quick succession, apply to these three rows signals having magnitudes representing brightness levels to be transmitted by the pixels in the rows. Because the three simultaneously-illuminated rows are always at a substantial distance from each other (i.e. one-third of the height of the display), the pixels in these rows are likely to represent respective portions of the overall displayed image having brightnesses that are dissimilar from each other. Consequently, the magnitudes of the signals applied to the three rows are substantially dissimilar from each other. This dissimilarity is also influenced by the fact that the signals applied to the three rows represent different colors. The human eye has different sensitivities to different colors and, thus, different brightnesses of the red, green and blue colored light bands must be transmitted by the array to produce the same apparent brightnesses. Thus, even when the three simultaneously-illuminated rows are to have the same apparent brightness, the magnitudes of the signals applied to the three rows will be substantially dissimilar.

Conventional column drive circuits, which use low-current buffer amplifiers to conserve electrical power and minimize voltage drops on the column conductors, have settling times which are too slow for making the required changes in signal magnitudes at the rates required. This leads to the following problems:

1. When large changes in the signal voltage for a given column are required for two sequentially-applied video data signals (e.g. for rows 1 and subsequently for row 1+N/3), the voltages to which capacitances associated with the pixels in the subsequent row are charged might not reach the required magnitudes. This would result in an inaccurate representation of both the brightness and the color for the pixels in the subsequently-driven row.

2. The same large changes in signal voltage lead to crosstalk caused by capacitive coupling from one row to nearby rows and from one column to pixels in nearby columns. Large sequential steps in pixel-driving voltages increase the likelihood of crosstalk.

3. A third problem arises from operation of the single-panel display apparatus disclosed in European Patent Application 0 492 721 A2 at high sampling rates, e.g. 10–100 megasamples per second. During the short sampling periods associated with such high rates, sampling capacitors which temporarily store voltage samples of the data signals, to be applied to the column conductors, might not completely charge (or discharge) to the sampled voltages. In effect, these sampling capacitors retain some memory of the charges which they have previously stored. This is particularly likely to occur when there are large voltage differences between the samples for pixels in two different rows, but in the same column, which are addressed in rapid sequence. In such an event, the pixels in the rows affected would inaccurately represent both color and brightness.

In accordance with the invention, the foregoing objects are accomplished, for each of the colored light bands in turn, by sequentially driving a group of closely-spaced rows of pixels substantially in synchronism with scanning of said rows by said colored light band. By "driving", it is meant that a row is selected while signals representative of predetermined transmissivities of the pixels in the row are applied to the column conductors. By "closely-spaced", it is meant that the rows are much closer to each other than the distance between the spatially-separated colored light bands. By sequentially-driving closely-spaced rows that are all being illuminated by the same colored light band (burst driving), the differences between the magnitudes of the sequential signals that are applied to the column conductors is minimized, at least for all but the first row in each group. As a result, the problems relating to objectionable ghosts, crosstalk, and inaccuracies in image color/brightness may be substantially alleviated without increasing the speed (and thus the cost) of the column-drive circuitry. This approach has the further advantages that the drive circuitry for the single-panel array need not be made more complicated than that already employed and the optical system need not be modified at all.

The ghosts and color/brightness inaccuracies at the first row in each burst-driven group are more difficult to eliminate than those at the remainder of the rows in the group. This is a consequence of the likelihood that there is still a large difference between the magnitudes of the signals for the first row in the group and that of the previously driven row (for a different colored light band at a distant row in a different group). In accordance with another aspect of the invention, the first row in each group is driven for a longer cumulative time period than other rows in the group. This additional time will enable the pixel capacitances for the first row in the group to more-accurately charge to the voltages sampled for the pixels, thereby substantially eliminating the ghosts and improving color and brightness accuracy. This may be done, for example, by repeatedly driving the first row in each group and driving each of the remaining rows in the group only once, or by driving each row only once, but driving the first row for a period of time that is longer than each of the remaining rows is driven.

In accordance with yet another aspect of the invention, the data signals representing the portion of the image to be displayed at the first row of pixels in each group is sampled for a longer cumulative time period than are the data signals for the other rows in the group. This will even further improve the color and brightness accuracy of the displayed image.

DESCRIPTION OF THE PREFERRED EMBODIMENTS

Figure 1:
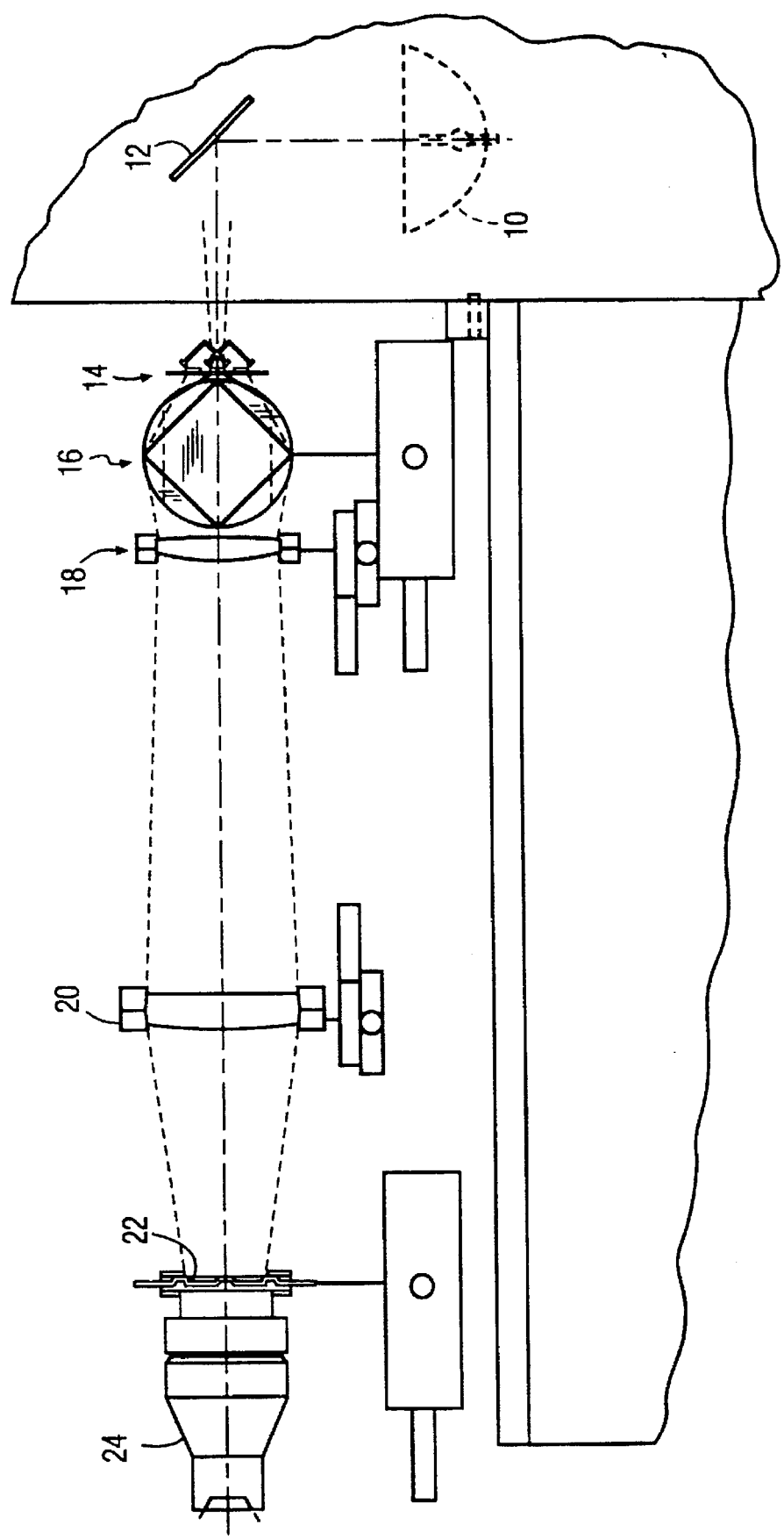
FIG. 1 is a side view of an optical system of a single-panel color projection display apparatus with which the invention may be used advantageously.
Figure 2A:
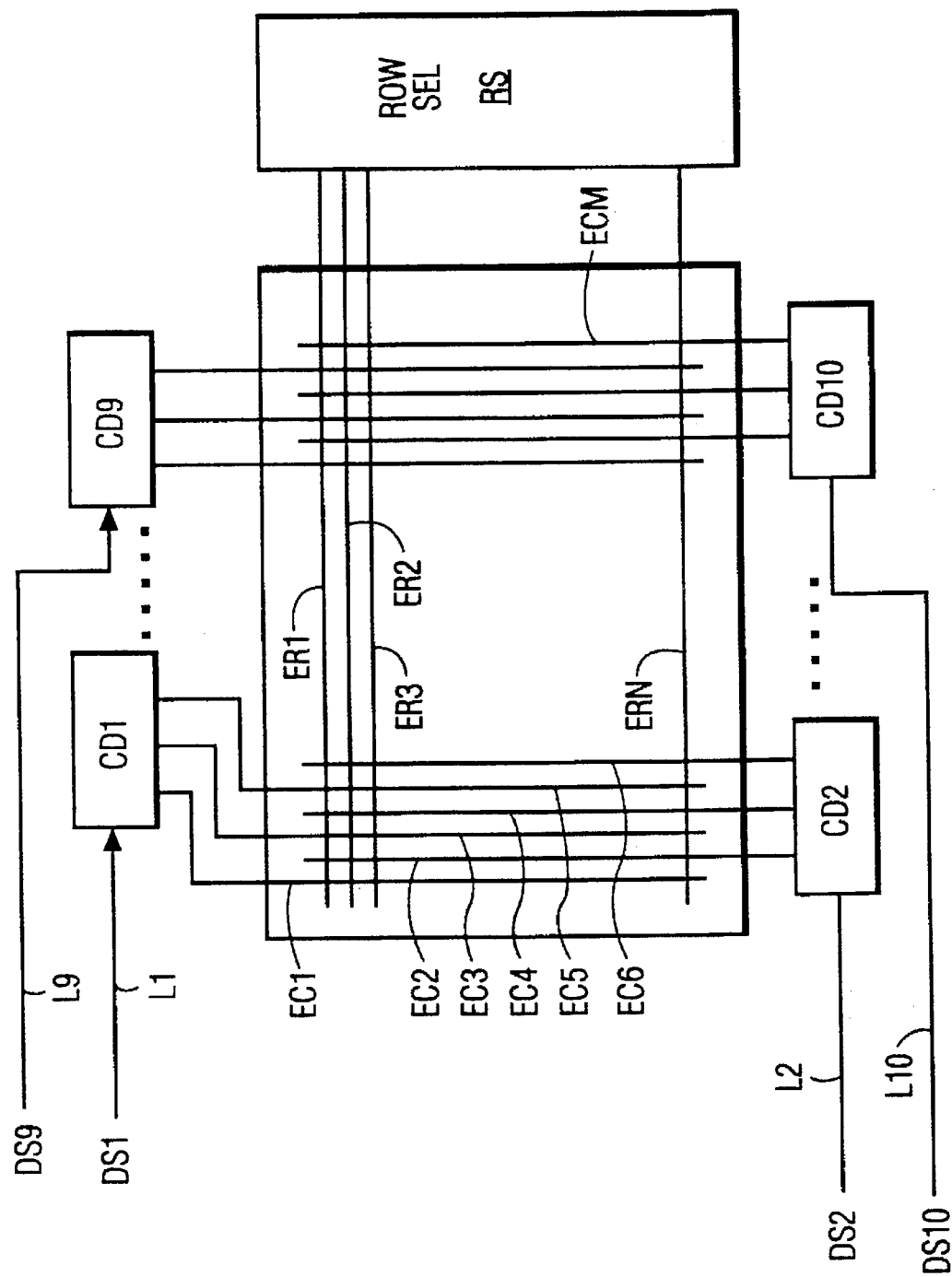
FIGS. 2A, 2B and 2C are schematic illustrations which collectively show an embodiment of circuitry for transferring data and driving a single-panel display in accordance with the invention.

FIG. 2A illustrates an exemplary single-panel display of the liquid-crystal type and associated drive circuitry. The display includes a matrix of row and column conductors ER1, ER2, ER3, . . . ERN and EC1, EC2, EC3, . . . ECM, respectively, of which only a representative number are shown. These conductors (also called electrodes) are insulated from each other where they cross, and typically are disposed on opposite sides of the panel substrate. Each crossing defines an addressable, capacitive pixel of the display.

The row conductors are electrically connected to respective outputs of a row selection circuit RS. Preferably this circuit is a programmable shift register which has the capability of sequentially selecting the row conductors in any predetermined order and for predetermined time periods. Depending on the number of rows in the display, one or a series of shift registers may be utilized. Alternatively, row decoder circuitry may be utilized.

The column conductors are electrically connected to respective outputs of ten column drive circuits CD1, CD2, ... CD10, of which only four are shown to simplify the figure. In this example, each of the drive circuits has only three outputs and these outputs are electrically connected to either a set of even-numbered, or odd-numbered, alternate column conductors. This arrangement of connection, the number of outputs per column drive circuit, and the number of column drive circuits are all variables which are generally determined by the rate at which data is to be transferred to the column conductors to effect display of an image.

Figure 2B:
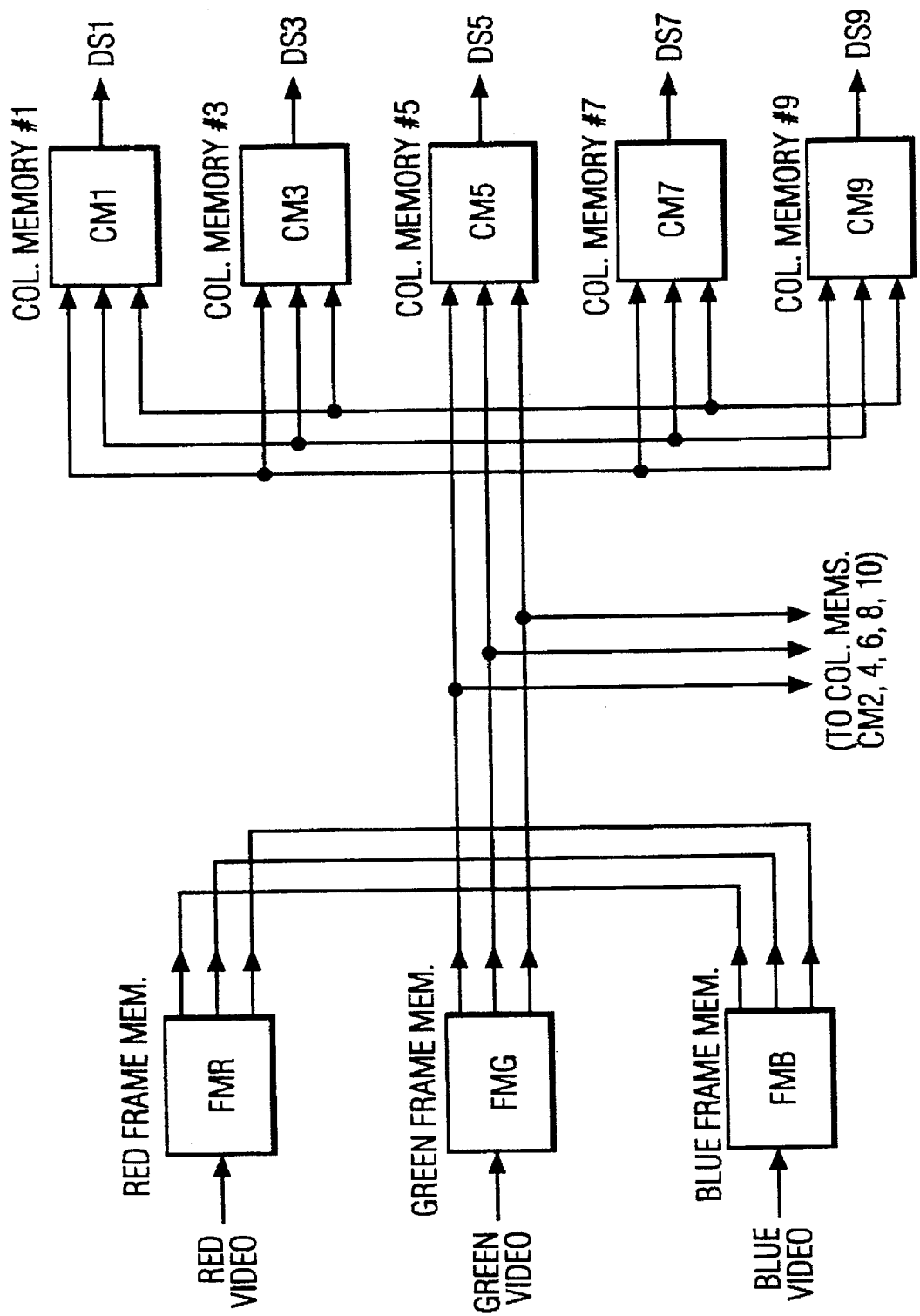

FIG. 2B illustrates an arrangement of memories for storing and transferring the data to the column drive circuits. The arrangement includes red, green and blue frame memories FMR, FMG and FMB, respectively, five odd-column memories CM1, CM3, CM5, CM7 and CM9, and five even-column memories CM2, CM4, CM6, CM8 and CM10 (not shown). All of these memories are interconnected by buses to facilitate the transfer of data, which may be done either in serial or parallel, depending on the number of separate data lines in each bus. In the preferred embodiment, each of these busses has 24 data lines for transferring the data in parallel.

Each of the red, green and blue frame memories has an input for receiving a video signal representing successive image frames of the respective color. The frame memories continually store new frames of data contained in these signals for the N×M pixels of the matrix display. At any given instant, the data stored in the three frame memories collectively defines one complete frame of a polychromatic image.

The ten column memories CM1–CM10 have the capability of collectively storing three complete rows of data, which are transferred to these memories from the frame memories over the connecting busses. Each individual column memory has the capability of storing that portion of this data which is to be transferred a respective one of the sets of three column conductors which are connected to a respective one of the column drive circuits. Each column memory also has the capability of converting digitally stored data to an analog data signal which is provided at an output of the memory. Signal lines L1–L10 electrically connect these outputs of the column memories CM1–CM10 to respective inputs of the column drive circuits CD1–CD10 to facilitate transfer of the stored three rows of data. This data is transferred in the form of analog data signals DS1–DS10.

Figure 2C:
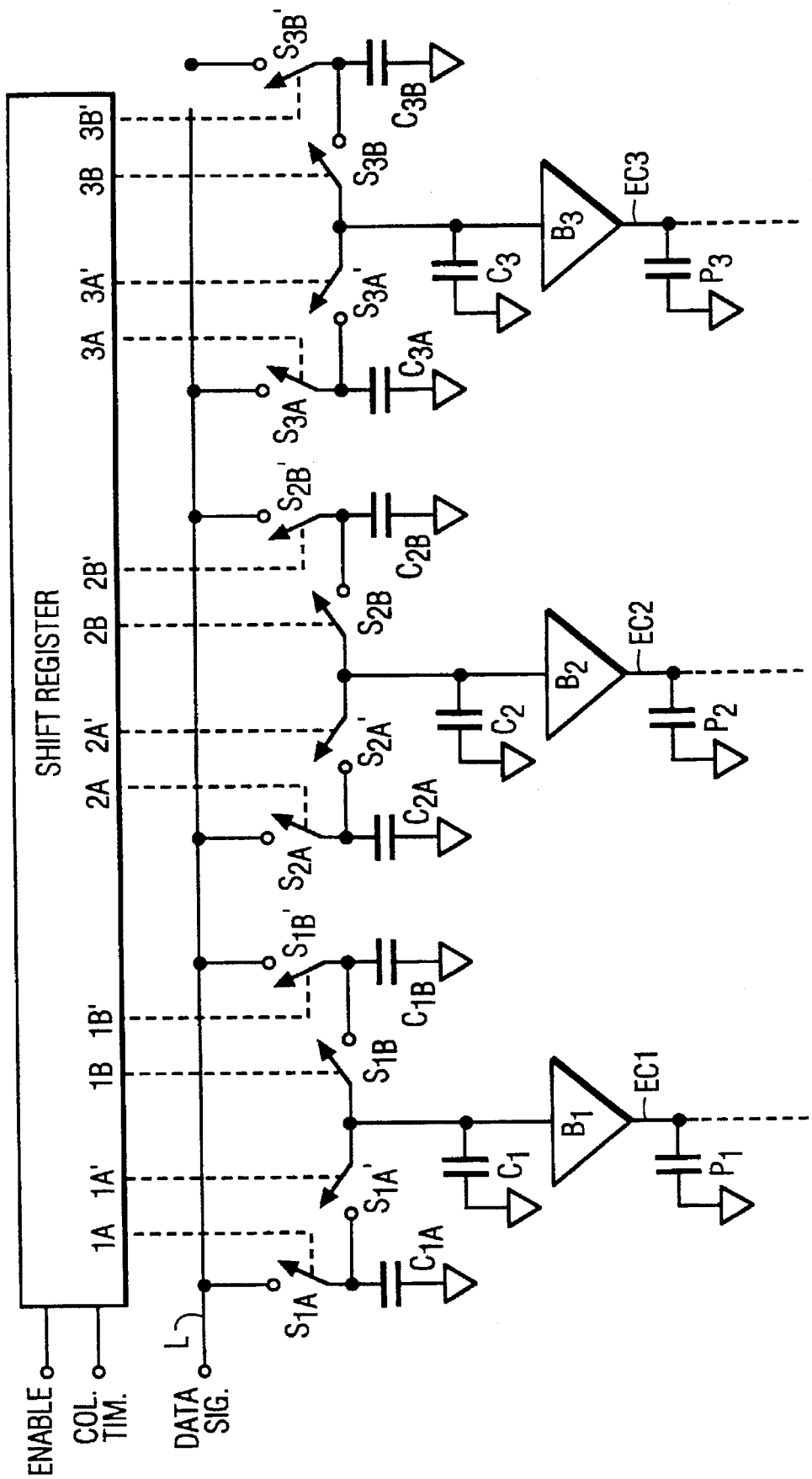

FIG. 2C illustrates in more detail a portion of one of the column drive circuits. All of these circuits are identical except for the particular signal lines and column conductors to which they are connected. Each column drive circuit includes a signal line L, which is electrically connected to an input for receiving a respective one of the data signals, and a shift register having enable and column timing inputs and a plurality of outputs 1A, 1A', 1B, 1B', 2A, 2A', ... The shift register outputs control a plurality of respective semiconductor switching devices (illustrated as simple switches) $S_{1A}$, $S_{1A}'$, $S_{1B}$, $S_{1B}'$, $S_{2A}$, $S_{2A}'$, ... Under this control these switches effect the sampling of the varying data signal magnitude and effect the subsequent transfer of these samples to respective ones of the column conductors by utilizing a plurality of storage capacitors and buffer amplifiers. The particular column drive circuit illustrated in FIG. 2C corresponds to CD1 and includes buffer amplifiers $B_1$, $B_2$, ..., having outputs which are electrically connected to the column conductors EC1, EC2, ..., respectively.

Figure 3A:
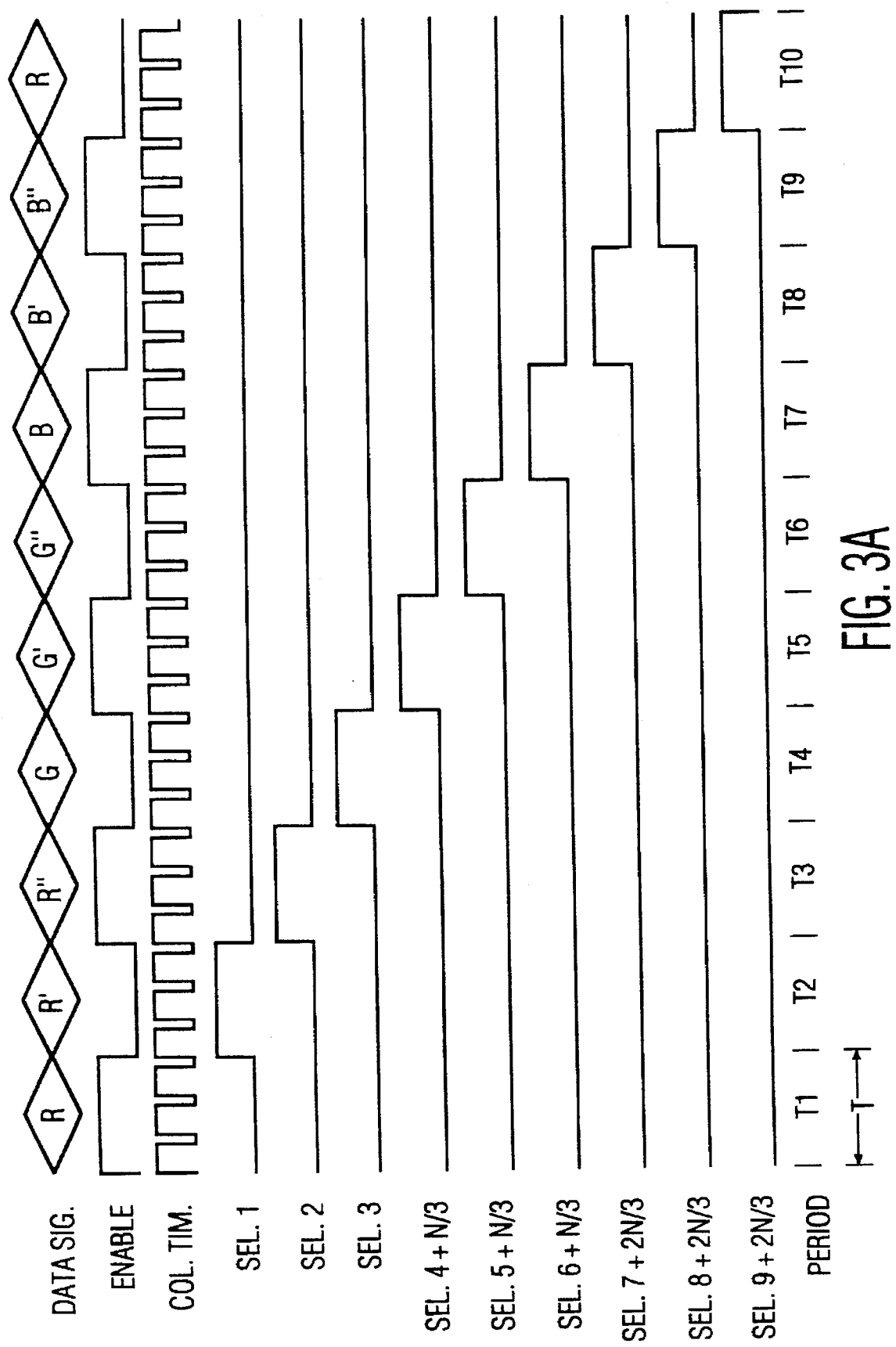
FIGS. 3A, 3B and 3C are timing diagrams showing some alternative methods of transferring data and driving a single-panel display apparatus in accordance with the invention.
Figure 3B:
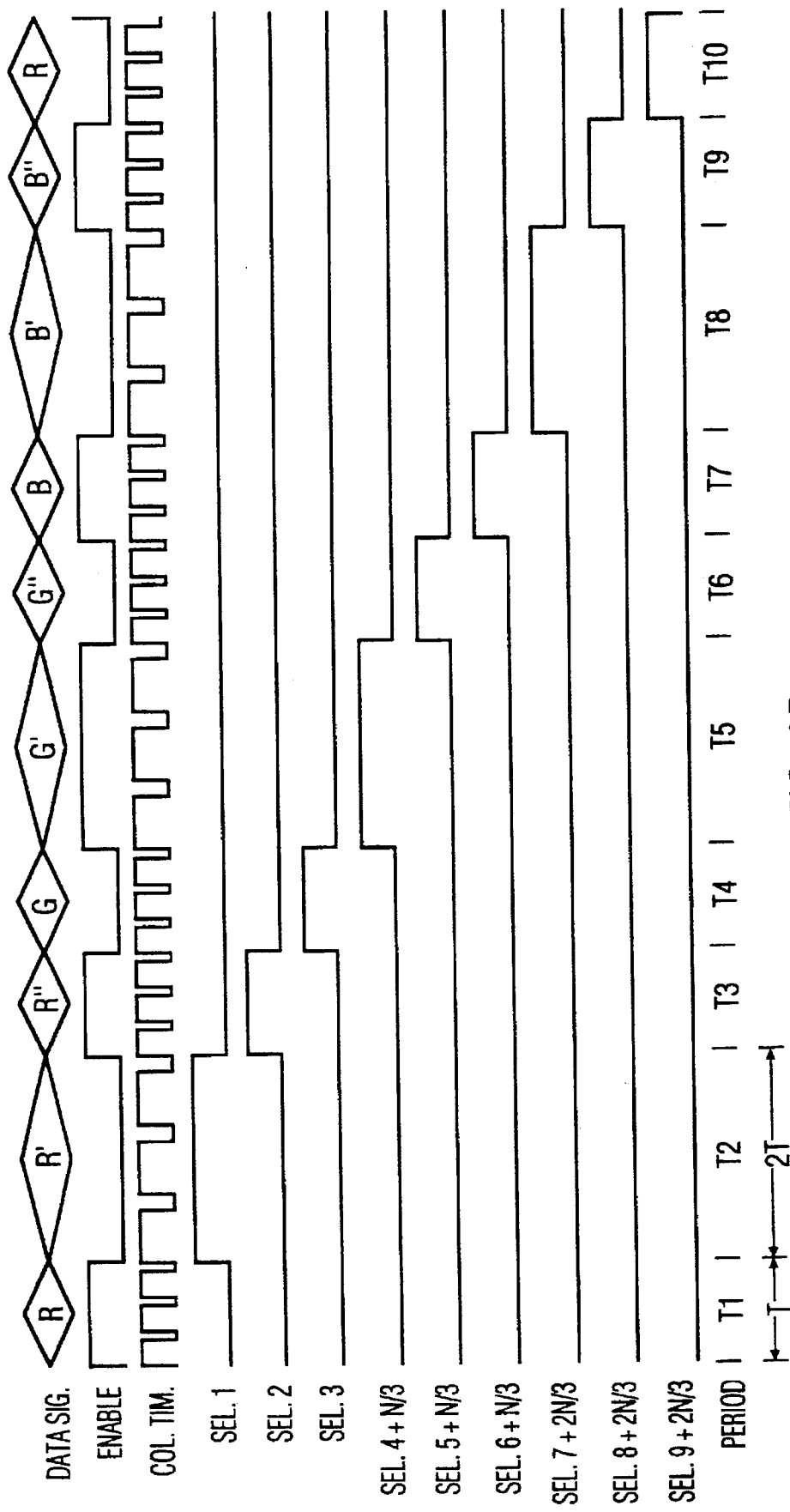
Figure 3C:
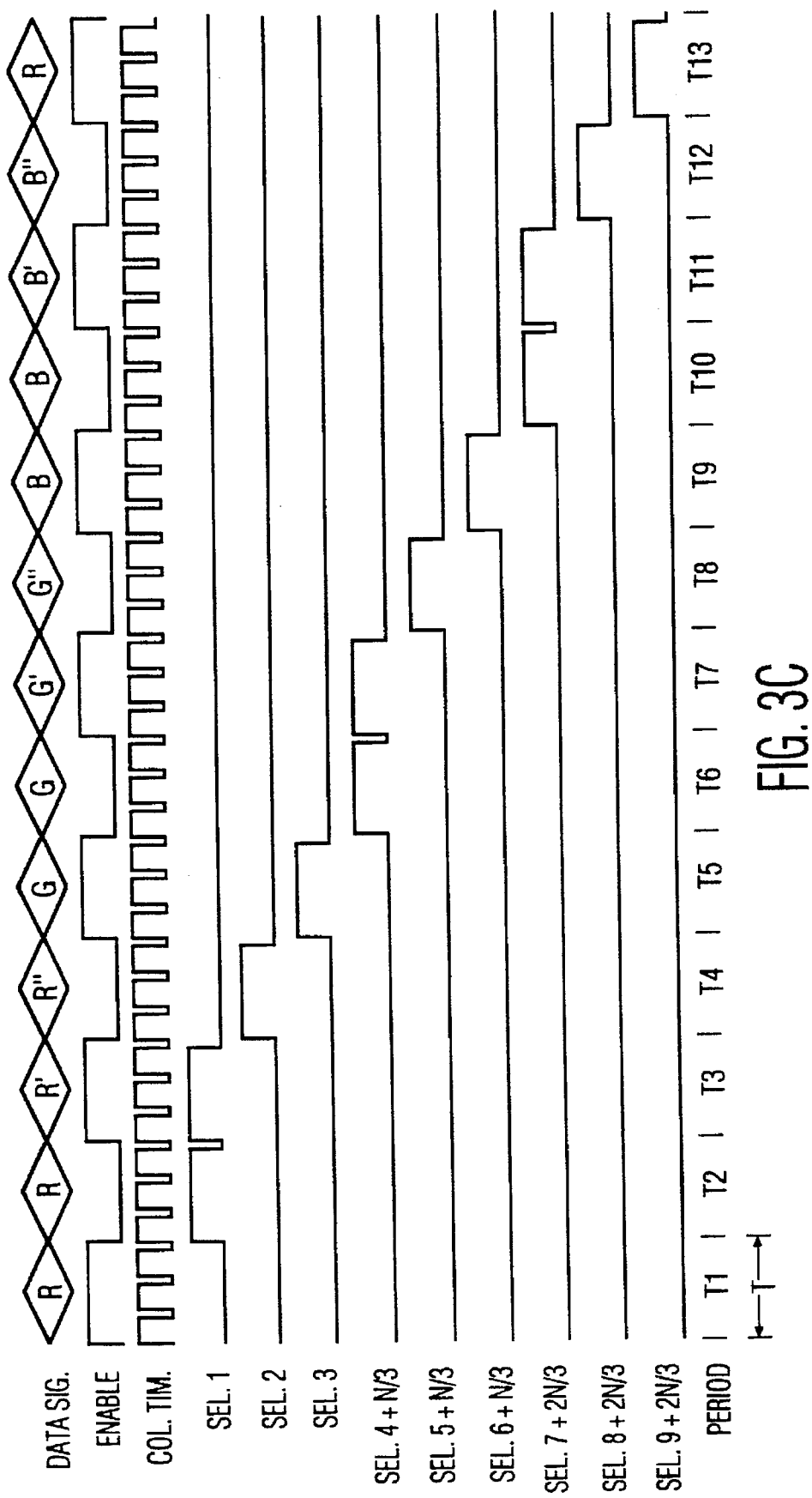

FIGS. 3A–3C illustrate three different embodiments of methods in which the data signals DS1–DS10 are sampled and transferred by the respective column drive circuits CD1–CD10 to the pixel capacitances of the display. In each method, this is carried out simultaneously by each of the ten column drive circuits. To simplify description, however, whenever reference is made to a specific column drive circuit, CD1 and the three connected column conductors EC1–EC3 will be used as an example.

In each embodiment, respective data signals are sequentially applied to the input of each column drive circuit in the order:

data R,R',R" for the next three rows of the pixels in the display to be illuminated by the red light band (e.g. rows 1,2,3);

data G,G',G" for the next three rows of the pixels in the display to be illuminated by the green light band (e.g. rows 4+N/3, 5+N/3, 6+N/3);

data B,B',B" for the next three rows of the pixels in the display to be illuminated by the blue light band (7+2N/3, 8+2N/3, 9+2N/3);

the next three rows of the pixels in the display to be illuminated by the red light band (e.g. rows 10,11,12);

etc.

Each successive data signal has a duration T, which must be sufficiently long for the varying magnitude of the data signal to be sampled by the respective column drive circuit for the three columns of pixels associated with the column conductors connected to the circuit. In a 640 column by 480 row array for which each of the red, green and blue frame memories receives new video data at the rate of 60 frames per second, the minimum value of the duration T is approximately 10 microseconds for state-of-the-art LCDs and associated drive circuitry.

Sampling is achieved under the control of an enable signal and a column timing signal, which are simultaneously applied to the respective inputs of the shift registers in the column drive circuits CD1–CD10. The enable signal controls which storage capacitors in each column drive circuit sample the data signal on the respective signal line L and which other storage capacitors transfer previously-sampled data-signal voltages to respective column capacitors $C_1$, $C_2$, ... When the enable signal is in a high (logic ONE) state, only shift register output pairs 1A/1B, 2A/2B, ... are enabled, allowing a pulse which is shifted through the shift register by the column timing signal to sequentially close the switches connected to these output pairs. When the enable signal is in a low (logic ZERO) state, only shift register output pairs 1A'/1B', 2A'/2B', ... are enabled, allowing a pulse which is shifted through the shift register by the column timing signal to sequentially close the switches connected to these outputs.

Select signals, produced by the row selection circuit in synchronism with the enable and column timing signals, sequentially bias the row conductors into a conductive state, enabling the data-signal voltages stored in the column capacitors to be transferred to the intrinsic pixel capacitances in the selected rows. As is well known in the art, this biasing is typically done via semiconductor switches electrically connecting the row conductors to the pixel capacitances. See, for example, U.S. Pat. No. 5,159,325.

Operation of the representative column drive circuit CD1 in accordance with the first embodiment, illustrated in FIG. 3A, will now be described in more detail:

During an initial time period T1, of duration T, a red-data signal R for row 1 is applied to signal line L, and a high enable signal and three successive column timing signal pulses are applied to the respective inputs of the shift register. Together, the high enable signal and these pulses cause output pairs 1A/1B, 2A/2B, 3A/3B to successively close switch pairs $S_{1A}/S_{1B}$, $S_{2A}/S_{2B}$, $S_{3A}/S_{3B}$ for the respective durations of the column timing pulses, transferring samples of the red data signal R for the pixel capacitances $P_{11}$, $P_{12}$, $P_{13}$ (at row 1, columns 1, 2, 3) to storage capacitors $C_{1A}$, $C_{2A}$, $C_{3A}$, respectively. During a time period T2, also of duration T, a red-data signal R' for row 2 is applied to signal line L, and a low enable signal and three successive column timing signal pulses are applied to the respective inputs of the shift register. Together, the low enable signal and these pulses cause output pairs 1A'/1B', 2A'/2B', 3A'/3B' to successively close switch pairs $S_{1A}'/S_{1B}'$, $S_{2A}'/S_{2B}'$, $S_{3A}'/S_{3B}'$ for the respective durations of the column timing pulses. Switches $S_{1B}'$, $S_{2B}'$, $S_{3B}'$ transfer samples of the red data signal R' for the pixels at row 2, columns 1, 2, 3 to storage capacitors $C_{1B}$, $C_{1B}$, $C_{3B}$, respectively. Simultaneously, switches $S_{1A}'$, $S_{2A}'$, $S_{3A}'$ transfer the samples of the red data signal R, previously stored in capacitors $C_{1A}$, $C_{2A}$, $C_{3A}$ during time period T1, to respective column storage capacitors $C_1$, $C_2$, $C_3$. A select signal is applied to row conductor ER1 during time period T2, causing the buffer amplifiers $B_1$, $B_2$, $B_3$ to charge pixel capacitances $P_{11}$, $P_{21}$, $P_{31}$, at the crossings of column conductors EC1, EC2, EC3 with row conductor ER1, to respective voltages stored on the capacitors $C_1$, $C_2$, $C_3$.

During time periods T3–T10, all of duration T, the data signal sampling and the transfer of sampled data continually repeats, as illustrated in FIG. 3A, until data has been transferred to the pixels in a first, second, and third groups of rows just before they are illuminated by the red, green, and blue light bands, respectively. In time period T10, red data R is also sampled for row 10, thus beginning a repetition of the sampling and transfer process steps with new data. The second embodiment, shown in FIG. 3B, substantially eliminates ghosts in the first row of each group, even when there is a large difference between the magnitudes of the data signal for each such first row and that of the last row in the previous group sampled and stored in the column storage capacitors $C_1$, $C_2$, $C_3$ of each column drive circuit. Operation of the column drive circuits in accordance with the second embodiment will now be described in detail:

During a time period T1, of duration T, operation is substantially identical to that of the corresponding period in the first embodiment, with samples of a red data signal R for the pixel capacitances $P_{11}$, $P_{21}$, $P_{31}$ in row 1 being stored in the capacitors $C_{1A}$, $C_{2A}$, $C_{3A}$, respectively.

During a time period T2, having a duration 2T, the samples of the red data signal R stored in the storage capacitors $C_{1A}$, $C_{2A}$, $C_{3A}$ during time period T1 are transferred to the column storage capacitors $C_1$, $C_2$, $C_3$ and to the pixel capacitances $P_{11}$, $P_{21}$, $P_{31}$. The durations of the column timing and select pulses are doubled (with respect to the first embodiment). Consequently, this doubles the amount of time provided to the column storage capacitors and the pixel capacitances for charging or discharging from previously-stored voltages (for the last blue data signal B" of a previous group) to the voltages representative of the samples of the red data signal R. The duration of this time period may be adjusted to compensate for whatever RC-time-constant delays are experienced in charging the pixel capacitances via the row and column conductors.

During time periods T3 and T4, each of duration T, the red data signals R' and R" for the second and third rows in the group, i.e. rows 2 and 3, are transferred to the column storage capacitors $C_1$, $C_2$, $C_3$ and to the pixel capacitances $P_{11}$, $P_{21}$, $P_{31}$. Also during time period T4, samples of the green data signal G for row 4+N/3 are stored in capacitors $C_{1B}$, $C_{2B}$, $C_{3B}$.

During time periods T5–T10, the data signal sampling and the transfer of sampled data continually repeats until red, green and blue data has been transferred to three complete groups of rows. Sampling of the red data signal R for row 10 also occurs in time period T10, beginning a repetition of the sampling and transfer steps for the next three groups of rows.

The third embodiment, shown in FIG. 3C, not only substantially eliminates ghosts in the first row of each group, but also substantially eliminates any memory of charges previously stored in the capacitors $C_{1A}$, $C_{2A}$, $C_{3A}$ and $C_{1B}$, $C_{2B}$, $C_{3B}$. In this embodiment, all time periods have the same duration T. Operation of the column drive circuits in accordance with the third embodiment will now be described in detail:

During two time periods T1 and T2, a red data signal R for a first row in a group is twice applied to the signal line L. In time period T1 samples of the first applied signal R for the pixel capacitances $P_{11}$, $P_{21}$, $P_{31}$ are stored in the storage capacitors $C_{1A}$, $C_{2A}$, $C_{3A}$. In time period T2 samples of the second applied signal R for the pixel capacitances $P_{11}$, $P_{21}$, $P_{31}$ are stored in the storage capacitors $C_{1B}$, $C_{2B}$, $C_{3B}$. Also during time period T2, the first of two successive select signals are applied to row conductor ER1, and the samples of the first-applied red data signal R are transferred to the column storage capacitors $C_1$, $C_2$, $C_3$ and to the pixel capacitances $P_{11}$, $P_{21}$, $P_{31}$.

During time period T3, the second of two successive select signals are applied to row conductor ER1, and the samples of the second-applied red data signal R are transferred to the column storage capacitors $C_1$, $C_2$, $C_3$ and to the pixel capacitances $P_{11}$, $P_{21}$, $P_{31}$. Also a red data signal R' for a second row in the group is applied to the signal line L and samples of this signal are stored in the storage capacitors $C_{1A}$, $C_{2A}$, $C_{3A}$.

During time periods T3 and T4, each of duration T, the red data signals R' and R" for the second and third rows in the group, i.e. rows 2 and 3, are transferred to the column storage capacitors $C_1$, $C_2$, $C_3$ and to the pixel capacitances $P_{11}$, $P_{21}$, $P_{31}$. Also during time period T4, samples of the green data signal G for row 4+N/3 are stored in capacitors $C_{1B}$, $C_{2B}$, $C_{3B}$.

During time periods T4–T13, the data signal sampling and the transfer of sampled data continually repeats until red, green and blue data has been transferred to three complete groups of rows. Sampling of a first of two applied red data signals R for row 10 also occurs in time period T13, beginning a repetition of the sampling and transfer steps for the next three groups of rows.

Although specific circuitry for driving a particular type of matrix display has been disclosed, usefulness of the invention is not limited to this circuitry. For example, column drivers of almost any design have some mechanism which may retain some memory of previous data(usually in the form of electrical charge). Regardless of the exact mechanism, burst driving in accordance with the invention can at least substantially alleviate the problem referred to in the Summary of the Invention.

We claim:

1. A method of producing a color image by means of a light valve comprising a row and column array of variable-transmissivity pixels, a plurality of row electrodes for selectively addressing the rows of pixels, and a plurality of column electrodes for transferring data representative of predetermined transmissivities to respective pixels on a selected one of the rows, said method comprising the steps of:

a. scanning a plurality of spatially-separated light bands of different colors across the rows of pixels;

b. for each of the colored light bands in turn, sequentially driving a group of closely-spaced rows of the pixels substantially in synchronism with the scanning of said rows by said colored light band.

2. A method as in claim 1 where, during the sequential driving of each said group of rows, a first one of said rows is driven for a longer cumulative time period than the other rows in said group.

3. A method of producing a color image by means of a light valve comprising a row and column array of variable-transmissivity pixels, a plurality of row electrodes for selectively addressing the rows of pixels, and a plurality of column electrodes for applying signals representative of predetermined transmissivities to respective pixels on a selected one of the rows, said method comprising the steps of:

a. scanning at least first and second spatially-separated light bands of different colors across the rows of pixels;

b. in sequence, immediately before the first light band illuminates each of a first group of closely-spaced rows of the pixels, applying respective ones of said signals to the pixels in said rows; and then c. in sequence, immediately before the second light band illuminates each of a second group of closely-spaced rows of the pixels, applying respective ones of said signals to the pixels in said rows.

4. A method as in claim 3 where, in each of the first and second groups of rows, time periods during which respective ones of said signals are applied for to the pixels in the first row in said group are cumulatively longer than time periods during which respective ones of said signals are applied to the pixels in each other row in said group.

5. A method of producing a color image by means of a light valve comprising a row and column array of variable-transmissivity pixels, a plurality of row electrodes for selectively addressing the rows of pixels, and a plurality of column electrodes for applying data signals to respective pixels on a selected one of the rows, said method comprising the steps of:

a. scanning first and second and third spatially-separated light bands of different colors across the rows of pixels;

b. in sequence, immediately before the first light band illuminates each of a first group of closely-spaced rows of the pixels:

(1) forming samples of a data signal representative of predetermined transmissivities to be assumed by respective pixels in a first row of the first group and transferring said samples to said pixels;

(2) for each other row in the first group, forming samples of a data signal representative of predetermined transmissivities to be assumed by respective pixels in said row and transferring said samples to said pixels;

c. in sequence, immediately before the second light band illuminates each of a second group of closely-spaced rows of the pixels:

(1) forming samples of a data signal representative of predetermined transmissivities to be assumed by respective pixels in a first row of the second group and transferring said samples to said pixels;

(2) for each other row in the second group, forming samples of a data signal representative of predetermined transmissivities to be assumed by respective pixels in said row and transferring said samples to said pixels; and d. in sequence, immediately before the third light band illuminates each of a third group of closely-spaced rows of the pixels:

(1) forming samples of a data signal representative of predetermined transmissivities to be assumed by respective pixels in a first row of the third group and transferring said samples to said pixels;

(2) for each other row in the third group, forming samples of a data signal representative of predetermined transmissivities to be assumed by respective pixels in said row and transferring said samples to said pixels.

6. A method as in claim 5 where, in each of the first, second and third groups of rows, time periods during which respective samples are being transferred to the pixels in the first row in said group are cumulatively longer than time periods during which respective samples are being transferred to the pixels in each other row in said group.

7. A method as in claim 5 or 6 where, in each of the first, second and third groups of rows, time periods during which respective samples are being formed for the pixels in the first row in said group are cumulatively longer than time periods during which respective samples are being formed for the pixels in each other row in said group.

* * * * *